Nov. 24, 1953          E. M. MAY          2,660,309
LUBRICANT CONDITIONING APPARATUS
Filed Aug. 6, 1949          4 Sheets—Sheet 1
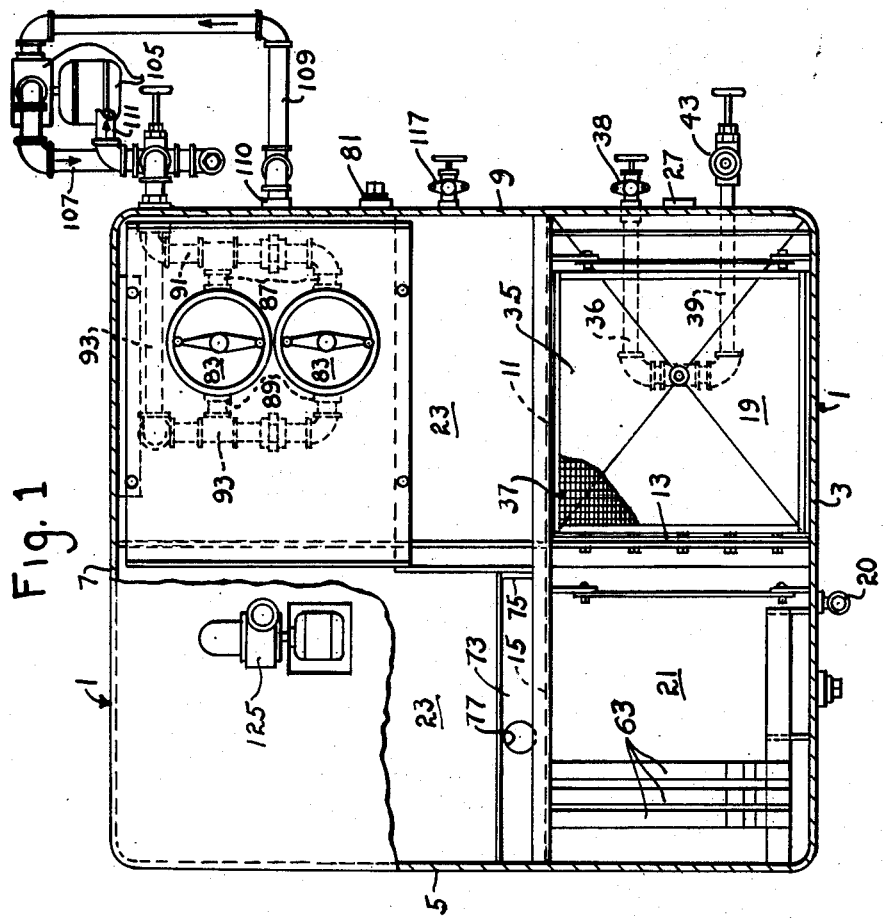
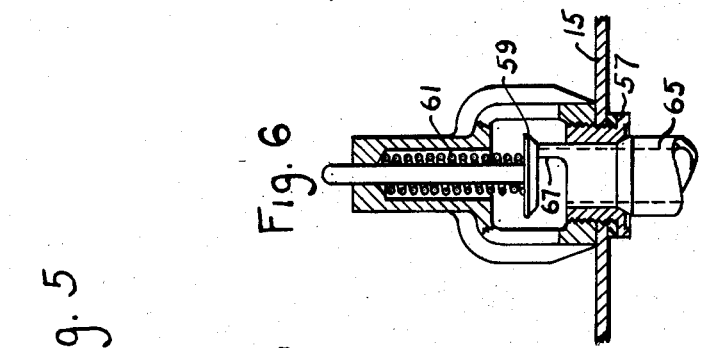
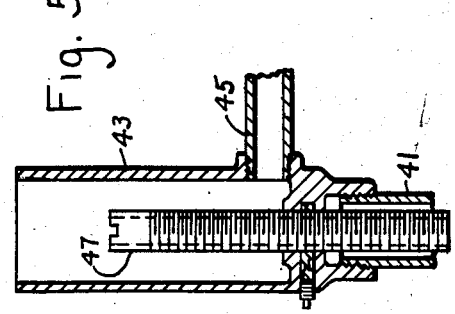
EDWIN M. MAY
*INVENTOR.*
BY Edmund W. E. Kamm
ATTORNEY

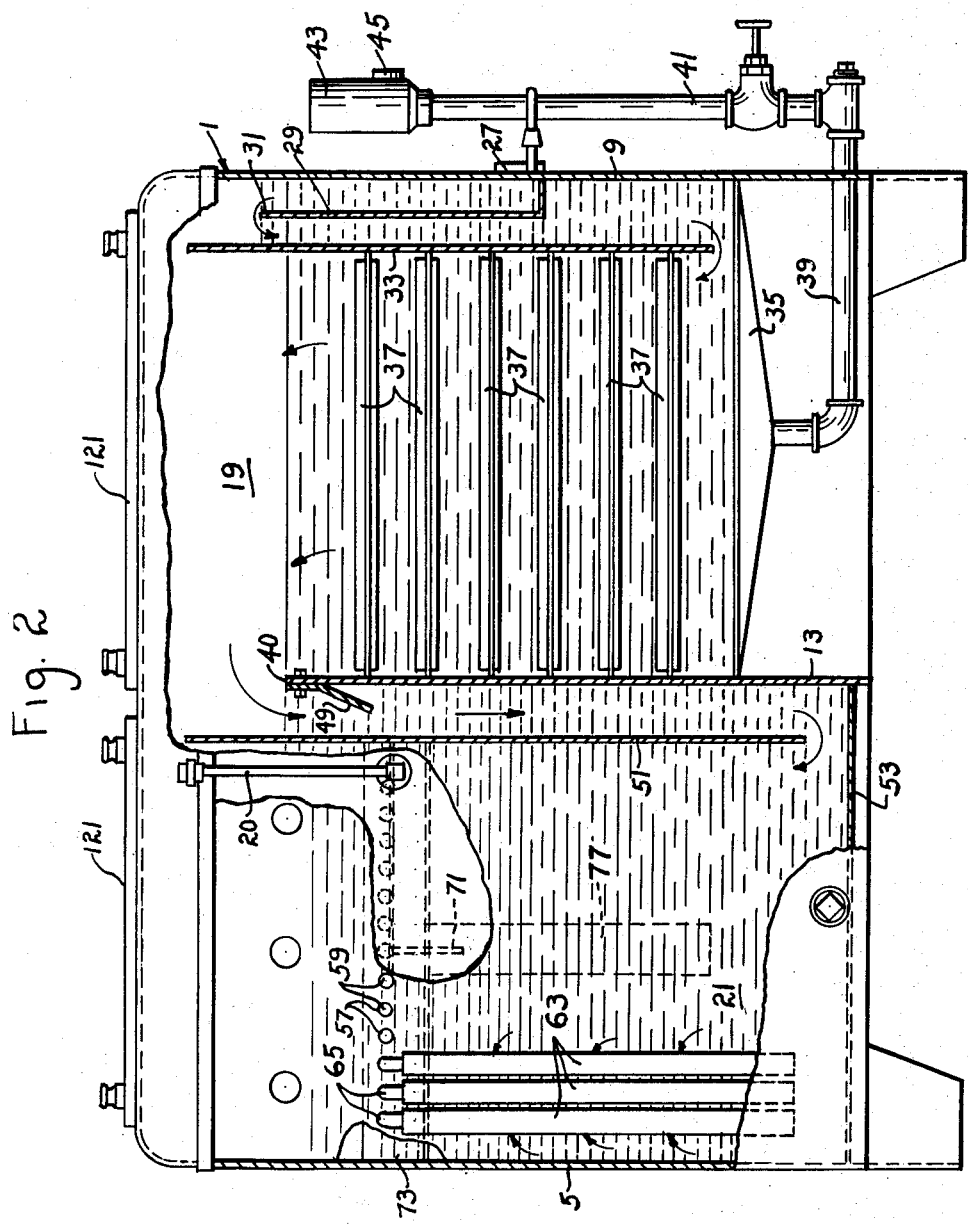

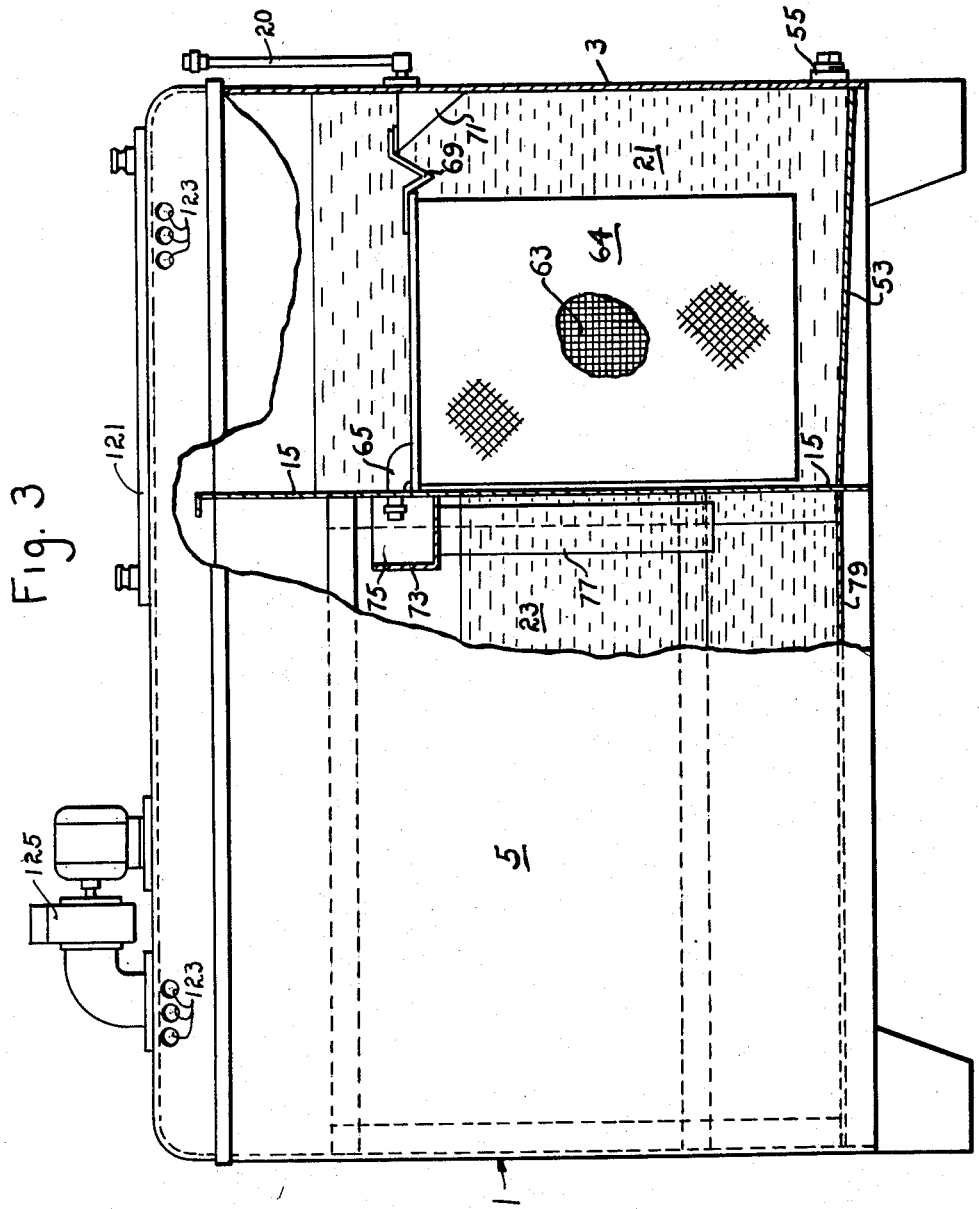

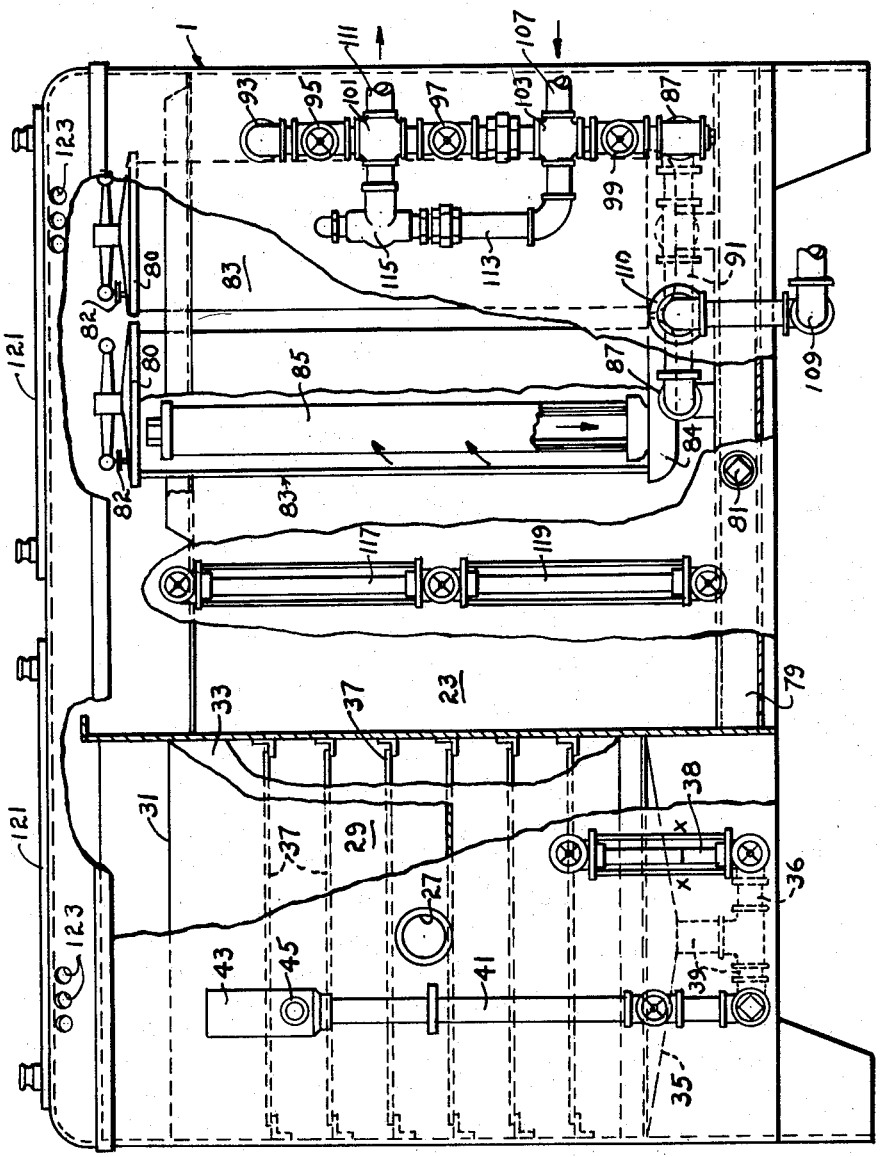

Patented Nov. 24, 1953

2,660,309

UNITED STATES PATENT OFFICE 2,660,309

LUBRICANT CONDITIONING APPARATUS

Edwin M. May, Scarsdale, N. Y., assignor to Bowser, Inc., Fort Wayne, Ind.

Application August 6, 1949, Serial No. 108,924

2 Claims. (Cl. 210—44)

This invention relates to an apparatus for maintaining the oil in a lubricating system in proper condition. More specifically, it relates to means for removing water and other foreign materials from oils, such as are used to lubricate the bearings of turbines, power generators, paper machines and other high speed machinery where the failure of a bearing results in great monetary loss.

This invention is an improvement of the apparatus disclosed in the Patent No. 2,388,636, issued to Frank B. Harvuot, November 6, 1945. In that patent, harmful materials were removed from the oils by means of water washing the oils. However, present day oils have been developed for the services indicated, which contain rust and oxidation inhibitors and additives for the purposes which are more or less soluble in water. This makes it necessary that the oil being conditioned be treated while minimizing all contacts of the oil with water.

It is an object of the invention to provide a conditioning apparatus which will remove foreign materials including water, sludges and micronic particles from a lubricating oil.

Another object of the invention is to provide apparatus for separating water from the oil and minimizing contact between the separated water and oil.

Yet another object is to provide a combined water separator and micronic filtration apparatus.

These and other objects will become apparent from a study of this specification and the drawings which are attached hereto and made a part hereof and in which:

Figure 1 is a plan view of the apparatus with parts removed to show the interior.

Figure 2 is a side elevation with parts broken away to show the precipitation and primary filtering compartments.

Figure 3 is a side elevation viewed from the left of Figure 2, showing the filtration and storage compartments.

Figure 4 is a side elevation viewed from the right of Figure 2, showing the precipitation and micronic filtration compartments.

Figure 5 is a sectional view of the water regulating height adjustment means.

Figure 6 is a sectional view of a primary filter nozzle valve.

Referring first to Figure 1, the numeral 1 represents a rectangular tank having four adjacent side walls 3, 5, 7 and 9, and intersecting walls 11, 13 and 15, which divide the tank into three compartments.

Of these 19 indicates the precipitation compartment, 21 the primary filtration compartment, 23 the storage and micronic or secondary filtration compartment.

Referring now to Figure 2, an inlet boss 27 is attached to wall 9 through which the lubricant to be treated flows into a trough 29 which is sealed at the ends by walls 3 and 11 so that the liquid must fill the trough and overflow the upper lip or rim 31 thereof as shown by the arrows. It runs down between the trough and a baffle 33, which is sealingly mounted between walls 3 and 11 and is spaced slightly above the bottom 35 so that the liquid may flow up through a number of fine-meshed wire screens 37, which are sealingly supported between the walls 3, 11, 13 and baffle 33. The oil flows out of chamber 19 over the weir 40 formed by wall 13. The bottom 35 is in the form of an inverted pyramid, which has a water drain pipe 39 and a water gage line 36 connected to it at its apex. The pipe 39 terminates in a water leg or column 41 which is shown in detail in Figure 5.

This column terminates at the upper end in a cup 43 which has a discharge outlet 45 at one side near the bottom and has a screw tube 47 sealingly mounted in the bottom so that it communicates with the column 41.

Pipe 36 terminates in a gage 38 which shows the height of the water in the bottom. This is held to a minimum.

This provides for the automatic discharge of water from pipe 39 as it accumulates in bottom 35, as will be described below.

The oil flowing over the weir runs down an apron 49 and merges with the column of liquid confined between wall 13 and a baffle 51 which is sealingly supported between walls 3 and 15, but above the bottom 53 of the primary filtration compartment 21.

It will be seen from Figure 3, that the bottom 53 slopes toward a drain 55 formed in wall 3.

Also as shown in Figures 2, 3 and 6, the wall 15 is provided with a number of outlet fittings 57, each of which has a valve 59 normally urged to a position to close the fitting by a spring 61.

A number of hollow screen filter elements 63 having cloth bag covers 64 have nozzles 65 which are adapted to enter the fittings 57 and open the valves 59. The nozzles are cut away as at 67 to permit egress of the lubricant. An arm 69 is fixed to each screen on the side opposite the nozzle and rests on a shelf 71.

The nozzles project into a trough 73 in the storage compartment 23. This trough is fixed to wall 15 and is sealed at the ends by walls 5 and 75. A drain tube 77 is connected to the central portion of the trough and extends toward the bottom 79 of the compartment. The latter slopes from the rear downwardly to the front (Figure 4) so that it may be drained through outlet 81.

A pair of micronic filter cases 83 are mounted in the compartment 23. These filters have removable caps 80 provided with vent valves 82 and may be of the type using polymerized phenolic resin impregnated paper cartridges 85 such as those disclosed in the co-pending application of Frank B. Harvuot, Serial No. 562,191, filed November 6, 1944, now Patent Number 2,584,387, February 5, 1952, for Expendable Cartridge Filter, or shown in the Patent No. 2,196,821, issued April 9, 1940, to George A. Arnold for Filter.

The cartridges are removably mounted in the bottom heads 84 of the filter cases.

The filters have their inlets 87 and outlets 89 manifolded by pipes 91 and 93. The pipes 91, 93 are connected outside the case by valves 95, 97, 99 and crosses 101, 103. Valve 97 is normally closed. The pressure or discharge side of a circulating pump 105 is connected by pipe 107 to cross 103 while the suction side of the pump is connected by pipe 109 to the outlet 110 of compartment 23.

The micronically filtered oil is discharged from cross 101 through pipe 111 to the turbine or other receptacle. A by-pass line 113 connects crosses 101 and 103 through a relief valve 115 so that in the event of back pressure building up in the filter, oil will by-pass the filter.

Suitable gage glasses 117 and 119 are provided in compartment 23 to show the level of oil therein.

The case 1 is provided with suitable removable covers 121 which give access to the various compartments so that they and the parts disposed therein may be cleaned.

Air inlet openings 123 are provided in the case at the top thereof and a fan 125, having its intake communicating with the interior of the case, is mounted on top thereof. This fan maintains a constant circulation of air above the compartments and prevents condensation of moisture on the case which would then drip into the oil.

Operation

Assuming that the apparatus has been set up so that the weir 40 is level, has been connected into the system and that the screens 37, filter bags 64 and filter cartridges 85 are in place, before filling the conditioner with oil, it is necessary to fill the bottom of the precipitation compartment with clean water until water reaches the level X—X in sight glass 38. This brings the water to a point slightly below the level of the bottom 35 of the compartment. Since the height of the screw tube 47 is less than that of the weir 40, it is obvious that if the water were not first charged into pipes 39 and 41, oil would run out the overflow 45 long before it reached the weir.

Oil is now introduced into the inlet 27. It fills trough 29 and overflows the lip 31 thereof, passes down between the trough and baffle 33, under the baffle and up through the precipitation screens 37. The screens have a large area and the flow of oil therethrough is slow so that water will be separated from the oil and precipitate onto the bottom 35, which being pyramidal in form, collects the water at the water outlet.

The oil rises in the compartment 19 until it overflows weir 49 and at this time the screw tube 47 is adjusted so that the water in leg 41 is just about to overflow. Any water collecting on the bottom 35 will enter pipe 39 and a corresponding amount will flow out of tube 47 so that the precipitated water is continuously and automatically discharged.

It is to be noted that the only oil-water interface is in pipe 39 which has a small cross-sectional area as compared with the area of the bottom 35 so that the contact between the oil and the water is minimized. This prevents the water from dissolving water soluble additives from the oil.

Once the precipitation compartment is full, the oil will flow over the lip 31 which is only slightly higher than weir 49 without substantial turbulence so as to minimize contact between the oil and air, to prevent oxidation.

After passing over the weir 49, the oil flows without undue agitation down apron 49 into the space between wall 13 and baffle 51, under the baffle and into the filtering compartment 21. The oil builds up in this compartment until the level of outlets 57 is reached when some oil will pass through the filter bags into the filter elements and out through spouts 65. Usually the filters impede the passage of the oil so that eventually the filters will be entirely submerged and when the flow through and out of the filters due to the head of oil equals the inflow of oil to the compartment, the head will be stabilized. When the head, as observed in sight glass 29 (Figure 2) becomes excessive, the filter elements are removed one by one and the bags are replaced. As each element is withdrawn from its fitting 57, the valve 59 closes the fitting so that no unfiltered oil can pass.

The filter elements may thus be cleaned without stopping the operation and the dirty bags may be reclaimed by washing them.

The oil flowing from the spouts 65 of the filters enters trough 73 in the storage compartment 23, runs down the spout 77 into the compartment, again without turbulence.

The filter cases 83 are mounted in the other end of the storage compartment and the circulating pump 105 when running will withdraw clean oil from the compartment 23 and pass it under pressure through line 107, cross 103, valve 89, manifold 87 into the filters 83 where it passes from the outside through the micronic filter cartridges 85, out through manifold 93, valve 95, cross 101 and line 111 to the turbine or other point of use.

The level of oil in compartment 23 is indicated by the sight glasses 117. If the level mounts appreciably while the circulating pump 105 is in operation, it may indicate that the filter cartridges are plugged and require replacement. The excess oil being pumped is by-passed through valve 115.

To change the cartridges it is necessary either to shut down the circulating pump, or, if this is not feasible, to close valves 95, 99 and open 97 so that oil may still flow to the turbine, to remove the covers 80 of the filters, unscrew the cartridges 85 from the heads 84 and substitute clean cartridges.

It is of course obvious that when the filters are first filled, or refilled after the cartridges are changed, the vent valves 82 must be opened after pressure from the pump is applied so as to evacuate all the air from the filters.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I consider to be new and desire to protect by Letters Patent of the United States is:

1. In an oil conditioner, the combination of a water precipitation compartment comprising a bottom and a side wall, an oil inlet, an oil outlet from said compartment, said outlet comprising an oil overflow of said side wall, a water outlet pipe connected at the bottom of said compartment, said bottom being shaped so that water will gravitate to said outlet pipe, a water overflow column connected to said water outlet pipe and extending to a level below that of the oil outlet, said water column and compartment being adapted to be charged with a predetermined amount of water, said oil outlet and the top of said overflow column being disposed at such levels that when oil fills said compartment to the mouth of said oil overflow outlet, the water-oil interface is located in the lowermost portion of said compartment and adjacent to said outlet pipe, a primary oil filtration compartment connected to said water precipitation compartment, a secondary oil filtration compartment connected to said primary oil filtration compartment, an expendable micronic filtration cartridge means mounted in said secondary compartment, means for pumping oil from said primary oil filtration compartment to said secondary filtration compartment and through said cartridge and to a point of use, and means for bypassing said pump and interrupting communication between said cartridge means and said pumping means so that the cartridge means may be replaced without stopping the flow of oil to the point of use.

2. In an oil conditioner, the combination of a water precipitation compartment and an oil filtration compartment, a water overflow mechanism connected to the bottom of said water precipitation compartment, an oil outlet comprising an oil overflow weir wall in said water precipitation compartment, a water outlet in said water overflow mechanism positioned so that the water-oil interface is located below said water precipitation compartment, a primary filtration compartment connected to receive oil from the oil overflow outlet from said water precipitation compartment, filters in said primary compartment, a storage compartment disposed to receive oil from said primary filtration compartment, micronic filtration means in said storage compartment, means for removing oil from the storage compartment and passing it under pressure through said micronic filtration means and discharging the filtered oil therefrom, and inclined surface weir means between said water precipitation compartment and said primary oil filtration compartment for preventing turbulence of the oil flowing therebetween.

EDWIN M. MAY.

References Cited in the file of this patent

UNITED STATES PATENTS

| Number | Name | Date |
|---|---|---|
| 1,129,893 | Morries | Mar. 2, 1915 |
| 1,148,834 | Emory | Aug. 3, 1915 |
| 1,165,640 | Utz et al. | Dec. 28, 1915 |
| 1,176,775 | Morris | Mar. 28, 1916 |
| 1,355,934 | Bannon et al. | Oct. 19, 1920 |
| 1,379,259 | Hans | May 24, 1921 |
| 1,396,889 | Sepulchre | Nov. 15, 1921 |
| 1,442,348 | McDermet | Jan. 16, 1923 |
| 1,628,201 | Scoville | May 10, 1927 |
| 1,948,654 | Emory | Feb. 27, 1934 |
| 2,196,821 | Arnold | Apr. 9, 1940 |
| 2,324,763 | Carruthers | July 20, 1943 |
| 2,388,636 | Harvuot | Nov. 6, 1945 |
| 2,457,959 | Walker | Jan. 4, 1949 |